No. 672,809. Patented Apr. 23, 1901.
S. S. RUSSELL.
QUILTING FRAME.
(Application filed Oct. 25, 1900.)
(No Model.) 2 Sheets—Sheet 1.
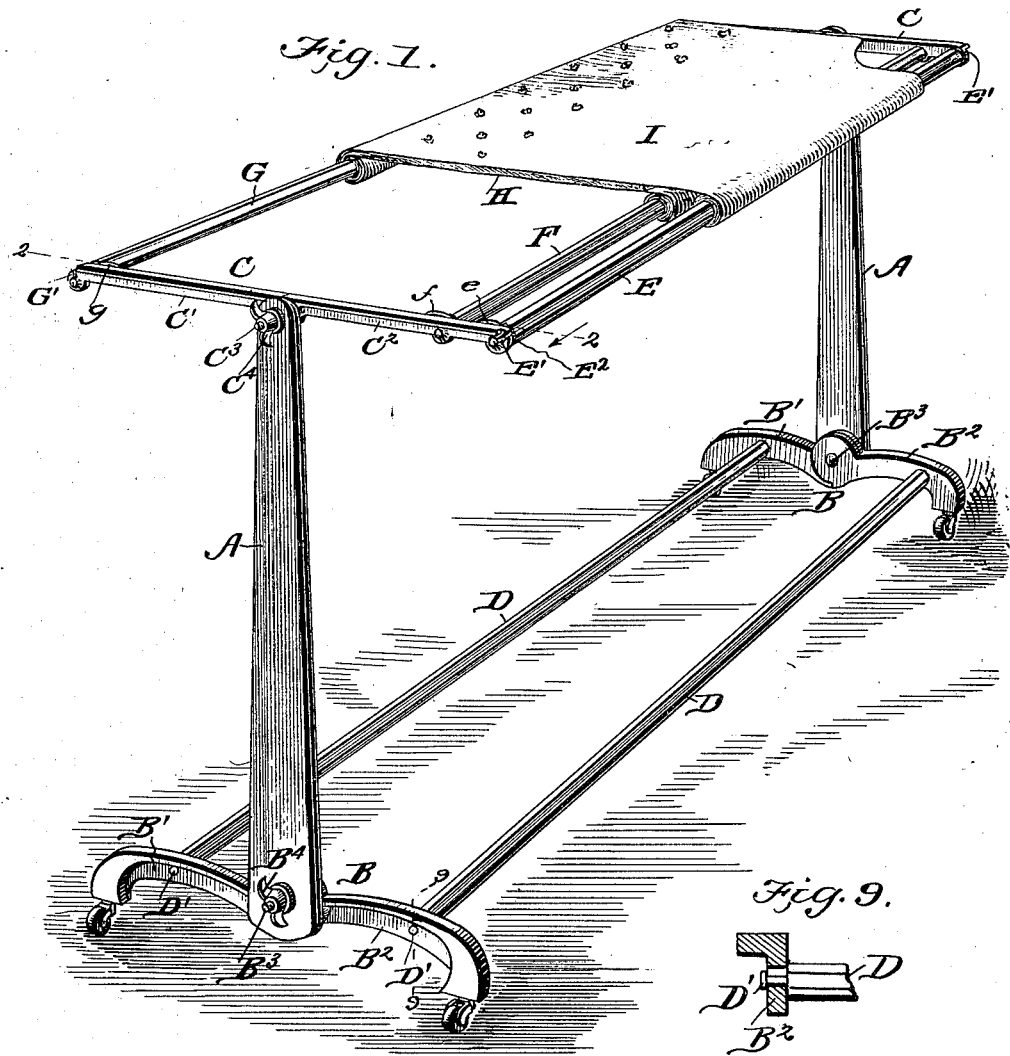
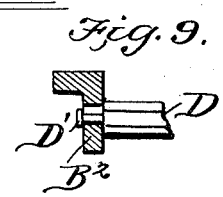
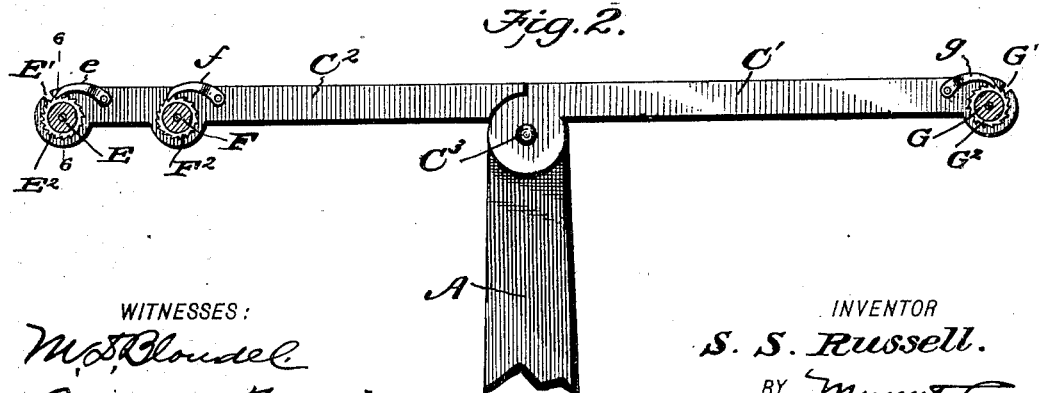
WITNESSES:
INVENTOR
S. S. Russell.
BY
ATTORNEYS No. 672,809. Patented Apr. 23, 1901.
S. S. RUSSELL.
QUILTING FRAME.
(Application filed Oct. 25, 1900.)
(No Model.) 2 Sheets—Sheet 2.
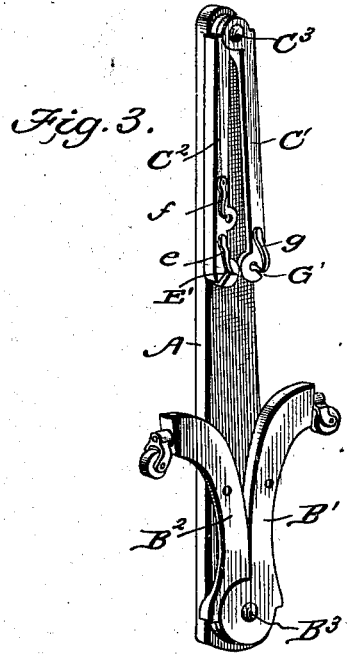
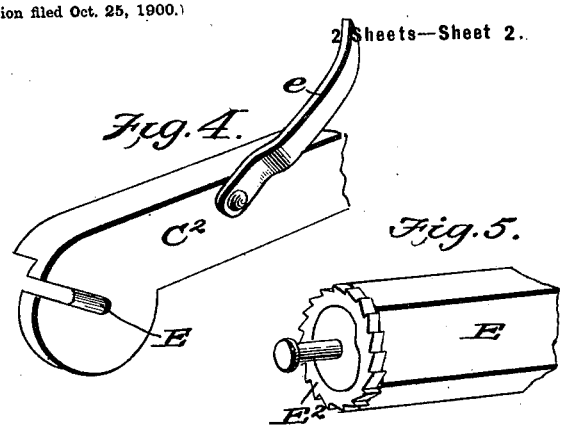
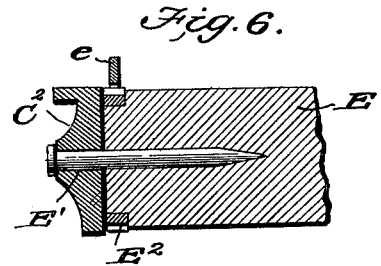
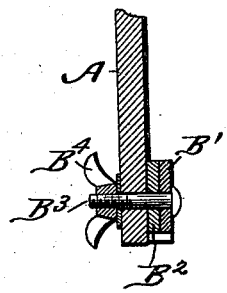
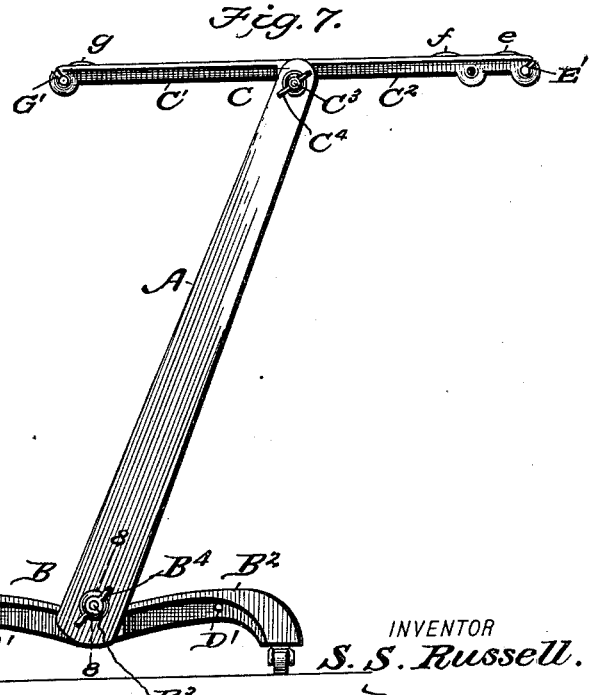
WITNESSES:
INVENTOR
S. S. Russell.
BY
ATTORNEYS
THE NORRIS PETERS CO., PHOTO-LITHO., WASHINGTON, D. C.

UNITED STATES PATENT OFFICE.

SIDNEY S. RUSSELL, OF SHREVEPORT, LOUISIANA.

QUILTING-FRAME.

SPECIFICATION forming part of Letters Patent No. 672,809, dated April 23, 1901.

Application filed October 25, 1900. Serial No. 34,343. (No model.)

*To all whom it may concern:*

Be it known that I, SIDNEY S. RUSSELL, residing at Shreveport, in the parish of Caddo and State of Louisiana, have made certain new and useful Improvements in Quilting-Frames, of which the following is a specification.

My invention is an improvement in quilting-frames, and has for an object, among others, to provide a novel construction of end frames which can be folded into a compact form and which can be readily operated to secure and tighten the lining and cover of the quilt; and the invention consists in certain novel constructions and combinations of parts, as will be hereinafter described and claimed.

In the drawings, Figure 1 is a perspective view of the quilting-frame. Fig. 2 is a detail cross-section on about line 2 2 of Fig. 1. Fig. 3 is a detail perspective view of one of the end frames folded. Fig. 4 is a detail perspective view of one end of one of the top sections. Fig. 5 is a detail perspective view of one end of one of the rollers. Fig. 6 is a detail section on about line 6 6 of Fig. 2. Fig. 7 is an end view of the quilting-frame tilted to an inclined position. Fig. 8 is a detail section on about line 8 8 of Fig. 7; and Fig. 9 is a detail section on about line 9 9 of Fig. 1, illustrating the headed studs on the bars connecting the opposite bases.

My quilting-frame includes two end frames which are constructed alike and are each formed with an upright A, a base B, and a top C. The base B is formed of two sections B' and $B^2$, which are rule-jointed together at their meeting ends and secured by their pivot-bolt $B^3$ to the upright A, near the lower end of the latter. This bolt $B^3$ is supplied with a winged nut $B^4$, which may be released to permit the adjustment of the sections B' and $B^2$ to the position shown in Fig. 1 or that shown in Fig. 3 and may then be tightened to secure the said sections in either adjustment. It will be noticed that the joint of sections B' and $B^2$ with each other and with the upright A permits the sections to fold upward alongside the upright A, as shown in Fig. 3. The opposite bases B are connected by the bars D, which extend from side to side of the quilting-frame and are provided at their ends with headed studs D', which fit in suitable openings in the sections of the bases and operate to brace the opposite side frames together. By the headed construction of the studs the latter engage with the bases B in such manner as to prevent accidental detachment of the parts and yet permit such detachment when desired. The tops C are composed of the sections C' and $C^2$, which are rule-jointed at their meeting ends and secured by their pivot-bolt $C^3$ to the uprights A near the upper ends of such uprights, winged nuts $C^4$ being provided for securing the parts together and for clamping them in any desired adjustment. The joint of the sections C' and $C^2$ is formed to permit the folding of such sections downward alongside the uprights A, as shown in Fig. 3. From this figure it will be noticed that the base-sections fold upward and the top sections downward or in an opposite direction, so that the end frames of the quilting-frame can be compactly folded whenever desired.

In one of the sections of the top (shown as the section $C^2$) I journal near its outer end two rollers E and F, the roller F being nearer the center of the top than the roller E, and in the other section, C', of the top, near its outer end, I journal a roller G. The roller F may be journaled permanently, if desired; but the rollers G and E are preferably journaled by fitting their trunnions in slotted bearings G' and E', as shown in the drawings, so they can be readily removed whenever desired. Each of the rollers is provided with a ratchet-ring $E^2$, $F^2$, or $G^2$, engaged by pawls *e*, *f*, or *g*, as shown, and operating to retain the rollers in any position to which they may be turned.

It will be noticed from the drawings that the frame can be readily opened for use, as shown in Fig. 1, and can be folded, as shown in Fig. 3. It will also be understood that any suitable form of cover may be applied to the top frames C when it is desired to use the device as a table and that by inclining the uprights A the height of the frame can be varied and the top frames may be adjusted to one side or the other to facilitate the quilting operation.

In practice the lining H is wound upon the roller F and the face I of the quilt is rolled upon the roller E, the opposite ends of the lining and cover or face I being suitably secured together and wound as the quilting proceeds upon the roller G.

It is obvious from Fig. 1 that the roller E may be lifted out of its bearings and raised with the cover I to permit the application of the cotton or other batting upon the lining H, which batting may be spread out evenly upon the lining before the cover I is applied by readjusting the roller E to its bearings in the top frames. When this is done and the parts are as shown in Fig. 1, the portion of the quilt-lining between the rollers F and G can be quilted and then wound upon the roller G and the operation proceed as before. It should be understood that in Fig. 1 I have broken away a portion of the quilt for purposes of illustration.

In practice the uprights A, the bars D, and the rollers may be of wood or other suitable material, while the sections B' B² and C' C² may preferably be made of malleable cast-iron. By preference I mount the base-frames on casters, so the device can be readily moved, as desired.

As the quilting operation proceeds from day to day the frame can be folded from time to time and placed out of the way at one side of the room.

Having thus fully described my invention, what I claim as new, and desire to secure by Letters Patent, is—

1. The quilting-frame herein described consisting of the uprights, the base and top sections composed each of rule-jointed sections, the joints of the top sections having stop-shoulders by which to limit the upward movement thereof and the joints of the base-sections having stop-shoulders by which to limit the downward movement thereof, and both sets of sections being foldable toward each other and alongside the uprights, in the folded adjustment of the frame, pivotal connections between the base and top sections and the uprights, and means supported by the top sections by which to carry the material to be quilted, substantially as and for the purposes set forth.

2. The quilting-frame herein described, comprising the uprights, the base and top portions, each being composed of sections rule-jointed at their meeting ends and having stop-shoulders by which to stop the sections in position for use, the pivot-bolts connecting such sections together and securing them to the uprights, nuts on said bolts for clamping the parts in any desired adjustment, the base-sections being arranged to fold upward and the top sections downward alongside the uprights, the parts connecting the opposite base-sections, the two rollers journaled in the tops near one end thereof and the roller journaled in the tops near the other end thereof, substantially as set forth.

SIDNEY S. RUSSELL.

Witnesses:
 SOLON C. KEMON,
 PERRY B. TURPIN.